UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

METHOD OF UNITING OBJECTS.

1,019,407. Specification of Letters Patent. Patented Mar. 5, 1912.

No Drawing. Application filed December 16, 1910. Serial No. 597,607.

*To all whom it may concern:*

Be it known that I, LEO H. BAEKELAND, a citizen of the United States, residing at Yonkers, in the county of Westchester and State of New York, have invented certain new and useful Improvements in Methods of Uniting Objects, of which the following is a specification.

The object of this invention is to utilize the infusible, insoluble condensation products of phenols and formaldehyde as a cement or adhesive material for cementing, joining or uniting objects or articles of a suitable nature, as for example glass, wood, metal, pottery, stone, leather, etc., and as a filling material for cracks, cavities or the like in these or other materials. These insoluble, infusible condensation products of phenols and formaldehyde are highly resistant to physical and chemical influences and possess great tenacity and strength, these qualities rendering them particularly desirable for the above purposes. They possess the further advantage that they have decided antiseptic properties and in the act of their formation sterilize the articles and destroy all bacterial life. However, the very fact of their complete infusibility and insolubility renders it impossible to utilize them in their final state. Therefore, the earlier stages of the reaction are conducted in such manner as to obtain partial reaction products which are soluble or fusible and may be applied in liquid form, undergoing afterward, and under appropriate treatment, a hardening or polymerization until they acquire their maximum strength and resistance. The simplest manner of utilizing these substances for the purpose above indicated is to apply them in their fusible and soluble condition, that is to say, in the condition of incomplete or partial reaction products which are capable of transformation by heat, or by heat and pressure, into the infusible products. This transformation may be considerably quickened by the addition of suitable chemical condensing agents as explained below. The above simple method has however many serious disadvantages which considerably curtail its practicable applications. For instance, during the transformation by polymerization into the insoluble and infusible product there occurs a considerable reduction of volume, amounting usually to about one per cent., which results in shrinkage, so that there is in the final product a very decided surface tension, which may produce either cracks or checking or lack of adherence, particularly when the cement is applied to a non-porous base. In order to avoid this undue shrinkage and to insure more perfect adherence it is preferred to distribute the stresses by adding, before the act of polymerization or final hardening, such materials as do not contract and serve to bring about a more regular distribution of the internal stresses existing in the mass. Such additions are found greatly to improve the adhesive properties of the cement.

In order to carry out my invention I may utilize any incomplete condensation product of phenols and formaldehyde which is transformable into the final insoluble, infusible condensation product. But before applying it, I mix with it in proportion properly to reduce the shrinking stresses an inert fibrous, cellular, granular or pulverulent substance, as for example finely-ground asbestos, glass, sand, emery, corundum, graphite, clay, Cornish stone, oxid of iron, silica, corborundum or other suitable substances. Or again, I can very advantageously use for this purpose, in case it is desired to avoid addition of foreign materials, the final insoluble, infusible condensation product itself, preliminarily reduced to powder and mixed with the partial condensation product as described above. The subsequent hardening of this partial condensation product into the final insoluble, infusible condensation product yields a mass which is substantially homogeneous in character and yet free from the objections above noted. To this material I may add a sufficient amount of a volatile organic solvent, as for example alcohol or acetone, to facilitate distribution and drying. In whatever way the application has been made, the hardening of the cementitious coating or its transformation into the insoluble, infusible condensation product, is carried out by known means, as for instance the application of heat or of heat and pressure, or the use of condensing agents, as for example acids, salts or bases. All of these means may be applied conjointly. In case acid condensing agents are used they may be employed in conjunction with substances which may afterward bind or neutralize the acid by a secondary chemical reaction, as for instance finely-divided metals, or certain metallic oxids or basic salts. I may also add other suitable substances, as for instance glycerin, resins, rubber, pigments, dyes, or other liquid or solid materials which tend to improve for certain uses the physical or chemical properties of the resulting product.

When metallic objects are to be united it is preferable to submit them to a preliminary pickling or acid treatment, in order that the cement may be applied to a clear, unoxidized metallic surface.

Instead of applying the partial condensation products in liquid form, they may be applied in solid form by dusting on or other suitable means, afterward melting them on the objects to be cemented, joined or filled.

In uniting objects the surfaces to be joined are first coated with the cement prepared by any of the methods indicated above, and the surfaces are then pressed or assembled in the proper relation and retained in such position until the cement has been transformed, usually by the application of heat or of heat and pressure, into the insoluble, infusible condensation product.

A cement in accordance with the present invention capable of forming a satisfactory union between porous or nonporous surfaces may comprise 40 parts by weight of ground flint, ground sand or ground emery, mixed with 60 parts of the above described liquid reaction product, the mixture being brought to the desired consistence by the addition of alcohol or other appropriate solvent.

A satisfactory method of preparing the initial reaction product for use in my cement is as follows: To 100 parts by weight of phenol, add 5 parts of caustic soda, previously dissolved in a minimum quantity of water. Mix thoroughly, and add 90 parts of 40% formaldehyde solution. Boil for about one-half hour under a return condenser, and then cool. The resulting liquid may if desired be further thickened by boiling or by evaporation until it acquires the required consistence. Finely-divided bodies may be added as above described. The liquid may be diluted as desired by addition of appropriate solvents, as for example alcohols.

In the above specification, as well as in the following claims, the word "phenol" is used to designate not only the first member of the phenol group but its homologues and isomers, or phenolic bodies, or mixtures thereof, which are equivalent in this reaction; similarly, I may use any suitable equivalents of formaldehyde, as for instance the polymers of formaldehyde, or other substances which can engender formaldehyde, or act as equivalents thereof.

I claim:

1. The method of cementing or joining objects or articles, which consists in applying to the surfaces to be united a cement or adhesive material containing such partial condensation products of phenol and formaldehyde as are capable of transformation into insoluble, infusible condensation products, bringing the surfaces into the desired relation, and then hardening the partial condensation product.

2. The method of cementing or joining objects or articles, which consists in applying to the surfaces to be united a cement or adhesive material containing such partial condensation products of phenol and formaldehyde as are capable of transformation into insoluble, infusible condensation products, in conjunction with a filling material adapted to reduce the shrinking stresses of the final product, bringing the surfaces into the desired relation, and then hardening the partial condensation product.

3. The method of cementing or joining objects or articles, which consists in applying to the surfaces to be united a cement or adhesive material containing such partial condensation products of phenol and formaldehyde as are capable of transformation into insoluble, infusible condensation products in conjunction with a filling material consisting of such insoluble, infusible condensation products, bringing the surfaces into the desired relation, and then hardening the partial condensation product.

4. The method of cementing or joining objects or articles, which consists in applying to the surfaces to be united a cement or adhesive material containing such partial condensation products of phenol and formaldehyde as are capable of transformation into insoluble, infusible condensation products and a solvent therefor, bringing the surfaces into the desired relation, and then hardening the partial condensation product.

5. The method of cementing or joining objects or articles, which consists in applying to the surfaces to be united a cement or adhesive material containing such partial condensation products of phenol and formaldehyde as are capable of transformation into insoluble, infusible condensation products in conjunction with a solvent and a filling material adapted to reduce the shrinking stresses of the final product, bringing the surfaces into the desired relation, and then hardening the partial condensation product.

In testimony whereof, I affix my signature in presence of two witnesses.

LEO H. BAEKELAND.

Witnesses:
HERBERT S. NAY,
W. S. GORDON, Jr.